(12) United States Patent
Hutchinson et al.

(10) Patent No.: US 12,202,042 B2
(45) Date of Patent: Jan. 21, 2025

(54) FINISHING OF ADDITIVELY MANUFACTURED PARTS WITH SMOOTHING AND COLOR

(71) Applicant: PostProcess Technologies, Inc., Buffalo, NY (US)

(72) Inventors: Daniel Joshua Hutchinson, Orchard Park, NY (US); Matthew J. Noble, Lancaster, NY (US); Marc Farfaglia, Buffalo, NY (US); Owen Wegman, Buffalo, NY (US)

(73) Assignee: PostProcess Technologies, Inc., Buffalo, NY (US)

( * ) Notice: Subject to any disclaimer, the term of this patent is extended or adjusted under 35 U.S.C. 154(b) by 227 days.

(21) Appl. No.: 17/768,439

(22) PCT Filed: Oct. 26, 2020

(86) PCT No.: PCT/US2020/057376
§ 371 (c)(1),
(2) Date: Apr. 12, 2022

(87) PCT Pub. No.: WO2021/081507
PCT Pub. Date: Apr. 29, 2021

(65) Prior Publication Data
US 2023/0241683 A1    Aug. 3, 2023

Related U.S. Application Data

(60) Provisional application No. 62/925,506, filed on Oct. 24, 2019.

(51) Int. Cl.
*B22F 10/62* (2021.01)
*B22F 10/66* (2021.01)
(Continued)

(52) U.S. Cl.
CPC ............. *B22F 10/62* (2021.01); *B22F 10/66* (2021.01); *B22F 12/82* (2021.01); *B33Y 40/20* (2020.01);
(Continued)

(58) Field of Classification Search
CPC .......... B33Y 40/20; B22F 10/62; B22F 10/66
See application file for complete search history.

(56) References Cited

U.S. PATENT DOCUMENTS

| 10,195,666 B1 | 2/2019 | Barnet et al. |
| 2017/0259507 A1* | 9/2017 | Hocker ................ B29C 64/245 |

(Continued)

FOREIGN PATENT DOCUMENTS

| CN | 106827544 A | 6/2017 |
| GB | 2571804 A | 9/2019 |

(Continued)

*Primary Examiner* — Kelly M Gambetta
(74) *Attorney, Agent, or Firm* — Lempia Summerfield Katz LLC

(57) ABSTRACT

A surface finishing apparatus and method for smoothing and coloring parts made by additive-manufacturing technologies is disclosed. The surface finishing apparatus includes a tank or chamber into which a part is placed. A colorant is added. The part is both colored and smoothed until the part is at a desired smoothness and color. The part may be smoothed by different suitable smoothing technologies, including abrading with solid media, spraying with a liquid fluid, spraying with solid particles entrained in a liquid fluid, or submersing in a liquid vortex. Also disclosed is a composition for a colorant for a finishing process that smooths a surface of an additively manufactured part while coloring the additively manufactured part.

13 Claims, 12 Drawing Sheets

(51) Int. Cl.
  *B22F 12/82*    (2021.01)
  *B33Y 40/20*    (2020.01)
  *C09D 7/20*     (2018.01)
  *C09D 7/41*     (2018.01)
  *C09D 163/00*   (2006.01)
  *C09D 167/00*   (2006.01)

(52) U.S. Cl.
  CPC .................. *C09D 7/20* (2018.01); *C09D 7/41* (2018.01); *C09D 163/00* (2013.01); *C09D 167/00* (2013.01); *B22F 2998/10* (2013.01)

(56) References Cited

U.S. PATENT DOCUMENTS

| | | |
|---|---|---|
| 2018/0170799 A1 | 6/2018 | Hillebrandt Poulsen et al. |
| 2018/0250889 A1 | 9/2018 | Czinger et al. |
| 2020/0238620 A1* | 7/2020 | Crabtree ................ C23C 14/24 |

FOREIGN PATENT DOCUMENTS

| | | |
|---|---|---|
| WO | 2018/217101 A1 | 11/2018 |
| WO | 2019/185756 A1 | 10/2019 |

\* cited by examiner

FINISHING OF ADDITIVELY MANUFACTURED PARTS WITH SMOOTHING AND COLOR

CROSS-REFERENCE TO RELATED APPLICATIONS

This application claims priority to U.S. Provisional Application No. 62/925,506, filed Oct. 24, 2019. This application incorporates by reference U.S. Pat. Pub. 2019/0022931.

FIELD OF THE DISCLOSURE

The present disclosure pertains to an apparatus and method for surface finishing parts formed by additive manufacturing processes, wherein surface finishing includes smoothing and coloring the part.

BACKGROUND OF THE INVENTION

Additive manufacturing technologies, including Multi Jet Fusion (MJF), Selective Laser Sintering (SLS), fused deposition modeling (FDM), and others, can result in parts that have uneven surfaces that require smoothing before the parts can be used for their intended purposes. For example, fused deposition modeling lays down material in layers. A plastic filament or metal wire is unwound from a coil and supplies material to produce a part. This process may result in a striated surface, where individual steps associated with each layer progress in an overall direction. Such a surface may not be suitable for some applications where a smooth finish is needed.

There has been significant progress toward addressing the need to improve how parts made by additive manufacturing processes are finished. Systems made by PostProcess Technologies, Inc. of Buffalo, New York provide for improved surface finishing of parts made by various different additive manufacturing processes. Even though there has been progress toward better finishing of parts made by additive manufacturing processes, there exists room for improvements. In some cases, it is desired to color parts made by additive manufacturing processes. In some cases, parts made by additive manufacturing processes are painted or dyed to a desired color. Coloring parts made by additive manufacturing processes can take additional time and resources. In addition, parts made by additive manufacturing processes may have different properties, such as porosity, density, and so on, that affect how the parts may be colored. Accordingly, there is a need for further improvements in how additively manufactured parts are finished.

Additional disclosure about prior techniques and processes for finishing parts made by additive manufacturing processes and removal of unwanted material from parts formed in the printing stage can be found in copending patent applications, Ser. Nos. 16/232,955, filed Dec. 26, 2018, 16/340,647, filed Apr. 9, 2019, 16/298,550, filed Mar. 11, 2019, 16/209,778, filed Dec. 4, 2018, and 16/519,237, filed Jul. 23, 2019, now U.S. Pat. No. 10,737,440, which are assigned to the owner of the present application, and the entire disclosures of which are incorporated by reference herein.

SUMMARY OF THE INVENTION

A surface finishing apparatus and method for smoothing and coloring parts made by additively manufacturing technologies are disclosed. The surface finishing apparatus includes a tank or chamber into which a part is placed and both colored and smoothed until the part is at a desired smoothness and color. The part may be smoothed by different suitable smoothing technologies, including abrading with solid media, spraying with a liquid fluid, spraying with solid particles entrained in a liquid fluid, or submersing in a liquid vortex. In some embodiments, the part is smoothed for a first duration period without coloring. Then, a colorant is added and the part is smoothed and colored until a desired smoothness and color is obtained. Other embodiments provide for use of a dry colorant, use of a liquid colorant, and the addition of more colorant during the finishing process.

BRIEF DESCRIPTION OF THE DRAWINGS

Preferred embodiments of the present invention will now be described, by way of example only, with reference to the attached Figures, wherein.

DETAILED DESCRIPTION OF THE INVENTION

In the following description, the various embodiments of the present invention will be described in detail. However, such details are included to facilitate understanding of the invention and to describe exemplary embodiments for implementing the invention. Such details should not be used to limit the invention to the particular embodiments described because other variations and embodiments are possible while staying within the scope of the invention.

Furthermore, although numerous details are set forth in order to provide a thorough understanding of the present invention, it will be apparent to one skilled in the art that these specific details are not required in order to practice the present invention. In other instances details such as, well-known methods, types of data, protocols, procedures, components, networking equipment, processes, interfaces, electrical structures, circuits, etc. are not described in detail, or are shown in block diagram form in order not to obscure the present invention.

Embodiments for finishing parts made by additive manufacturing processes are not limited to the additive manufacturing and 3D printing methods disclosed herein. The embodiments disclosed herein can be applied for finishing parts made by a wide variety of additive manufacturing and 3D printing technologies, including FDM, PolyJet, DMLS, CBAM and the like, along with various composite materials and part geometries.

Figure 1:
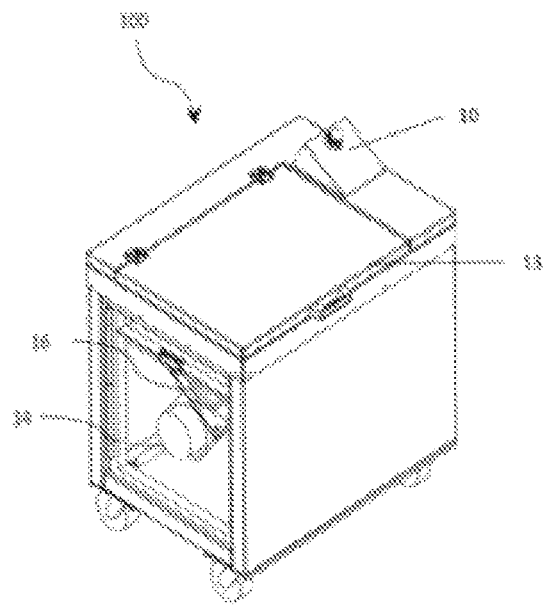
FIG. 1 is a top perspective view of a part finishing apparatus in accordance with a first embodiment of the invention.
Figure 2:
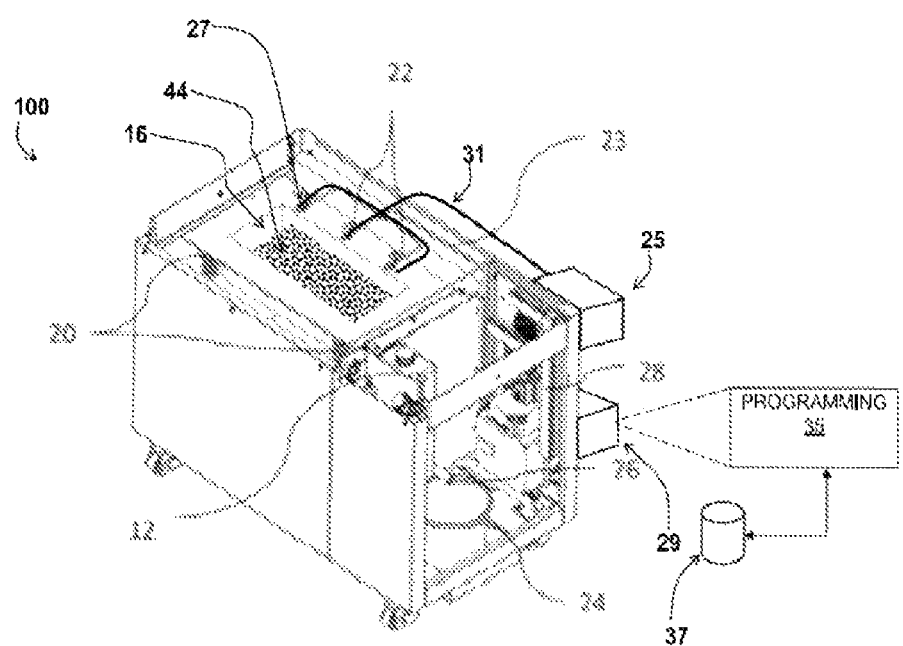
FIG. 2 is another top perspective view of the part finishing apparatus depicted in FIG. 1.

Referring now to FIGS. 1 and 2, an embodiment of a part finishing apparatus 100 is shown. The part finishing apparatus 100 is used for finishing parts made by additive manufacturing processes. In particular, the part finishing apparatus 100 provides for both smoothing and coloring parts made by additive manufacturing processes. The part finishing apparatus 100 may be similar to the surface finishing apparatus embodiments disclosed in US Patent Application Publication US20190022931, filed Jun. 30, 2017, except as disclosed herein. The part finishing apparatus 100 may be similar to a NITOR, RADOR, or LEVO machine, manufactured by PostProcess Technologies, Inc. of Buffalo, N.Y.

Referring to FIGS. 1 and 2, the part finishing apparatus 100 includes a lid 13 that opens to allow placement of an additively manufactured part in media 44 (shown in FIG. 2) held in a finishing tank 16. The finishing tank 16 may be comprised of urethane or other suitable durable non-reactive material. The part finishing apparatus 100 includes a control panel 10 including a user interface that allows an operator to input parameters, such as time and motor speed, as well as other parameters as explained below. An eccentric motor 14 is below and attached to the finishing tank 16. The finishing tank 16 is suspended on springs 20, which control the force applied by the eccentric motor 14, resulting in a vertical motion on the order of 1 to 3 millimeters. The eccentric motor 14 operates to cause the finishing tank 16 to vibrate in a manner that results in surface smoothing (also referred to as surface equalization) of a part located in the media 44 in the finishing tank 16. In some embodiments two eccentric motors 14 may be used side by side and/or on opposite sides of the finishing tank 16.

A supply tank 12 contains a supply of the media 44 for dispensing into the finishing tank 16 through spray nozzles 22, which are connected to the supply tank 12 through spray nozzle piping 23. The supply tank 12 is shown adjacent to the finishing tank 16 to provide the media 44 to the spray nozzle piping 23. A wastewater removal bucket 24 provides a means for separation of liquid from solid waste after wastewater leaves a wastewater outlet 26 at the bottom of the finishing tank 16.

In this embodiment, the spray nozzles 22 include three spray nozzles spaced evenly at a top edge of the finishing tank 16. The spray nozzles 22 point directly at the media 44 in the finishing tank 16.

Located adjacent to the spray nozzles 22 are colorant nozzles 27. In this embodiment, there are three colorant nozzles 27, one for each of the spray nozzles 22. In alternative embodiments, there may be more or fewer colorant nozzles. The colorant nozzles 27 are located at the end of a colorant supply line 31 that connects to a colorant supply tank 25.

An electronics panel 28 (shown in FIG. 2) provides electrical connections for the eccentric motor, the control panel 10, and other hardware of the part finishing apparatus 100. The electronics panel 28 includes an onboard computer 29 that runs on or more computer-executable programs 35 (sometimes referred to herein as "programming software 35") that enable the computer to control operations of the part finishing apparatus 100, as explained below. For example, the flow rate of media 44 exiting the spray nozzles 22 is determined by running the program 35 on the onboard computer 29. The electronics panel 28 also includes or has access to a recipe database 37. The recipe database 37 is stored on a data storage medium, which may be located locally or remotely.

Figure 3:
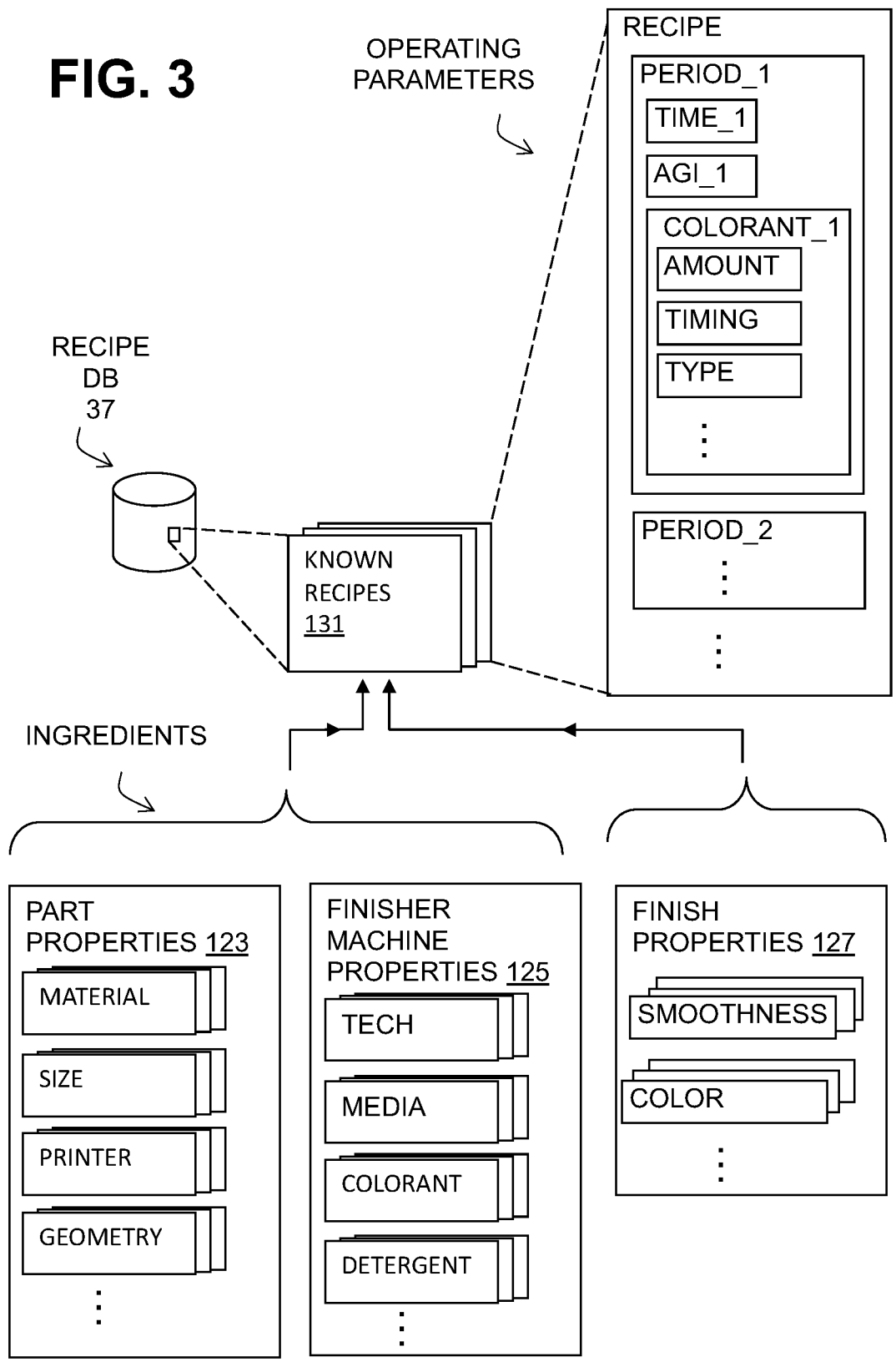
FIG. 3 is a diagram showing components of the recipe database shown in FIG. 2.

FIG. 3 is a diagram showing components of the recipe database 37 accessed by the onboard computer 29 that is running the programming software 35. The recipe database 37 includes known recipes 131 (i.e., instructions) that specify operating parameters for running the finishing apparatus 100 to produce finished parts with a desired smoothness and a desired color, starting with specified ingredients. The known recipes in the recipe database 37 include previously used recipes, recipes that have been developed over time both from the current apparatus or other apparatuses, recipes that have been developed experimentally, or recipes that are calculated based on known part, ingredient, and machine properties. In an embodiment, the recipe database 37 includes thousands of recipes.

The recipe database 37 includes data 123 about different additively manufactured parts, including the material of which the part is composed, the size of the part, the model of the printer that manufactured the part, the geometry of the part, and other possible properties. The recipe database 37 includes data 125 about different part finisher apparatus properties, including the technology used by the part finisher apparatus, the media used in the part finisher apparatus, the colorant(s) used in the part finisher apparatus, the detergent(s) used in the part finisher apparatus, as well as other possible properties. The recipe database 37 also includes data 127 about different desired properties of the finished part, such as the desired smoothness and the desired color.

Each known recipe 131 includes operating parameters for the part finisher apparatus. The operating parameters may include data that define the timing when media is to be added, when colorant is to be added, the agitation level to use at specific stages, and so on. There may be additional parameters, such as temperature, pressure, and humidity. In one embodiment, a recipe includes data that define one or more periods (i.e., durations of time). For each period, the recipe may include information about the timing (duration) of that period, an agitation level of the part finishing apparatus for that period, what type, if any, colorant is to be added, the amount of colorant to be added, and so on. For example, a recipe may include data for an initial period (10 minutes) during which 40 grams of a dry powder acid dye is added to a solid media composed of UPM1 and then mixed. In another example, a recipe may include a period that defines a stage at which the part finishing apparatus is operated to smooth a part without a colorant. In another example, a recipe may include one or more periods that define a stage at which additional colorant is added to the part finishing apparatus.

The known recipe database 131 can be used to identify a known recipe to produce a finished part with a desired smoothness and color, given properties of an unfinished additively manufactured part, as well as properties of the part finisher apparatus.

When finishing a part, an appropriate media is selected. Information about selecting an appropriate media is disclosed in US Patent Application Publication US20190022931. Additionally, a lubricant, liquid detergent, and anti-foaming solution may be added to the part finishing process. An appropriate detergent is PLM-001-SURF (PG3) from PostProcess Technologies, Inc. An appropriate lubricant may be used, for example to reduce any tendency of the media or the colorant from sticking to walls of the part finisher apparatus. Information about selection of an appropriate media, detergent, lubricant and anti-foaming solution may be provided by the recipe database.

OPERATION

General Operation.

Parts being finished in the part finishing apparatus are smoothed and colored in an overall process performed by the parts finishing apparatus. As described herein, there are different embodiments of operation of the finishing process. In some embodiments of operation of the finishing process, parts being finished in the parts finishing apparatus are subjected to smoothing and coloring at the same time. Some embodiments of operation of the finishing process may include a portion of time in which the parts are smoothed without also being colored. Some embodiments of operation of the finishing process may include the step of adding colorant before the smoothing process begins. Some embodiments of operation of the finishing process may include the step of adding additional colorant one or more times before the smoothing is completed during the finishing process. Some of these embodiments of operation are described herein.

Figure 4:
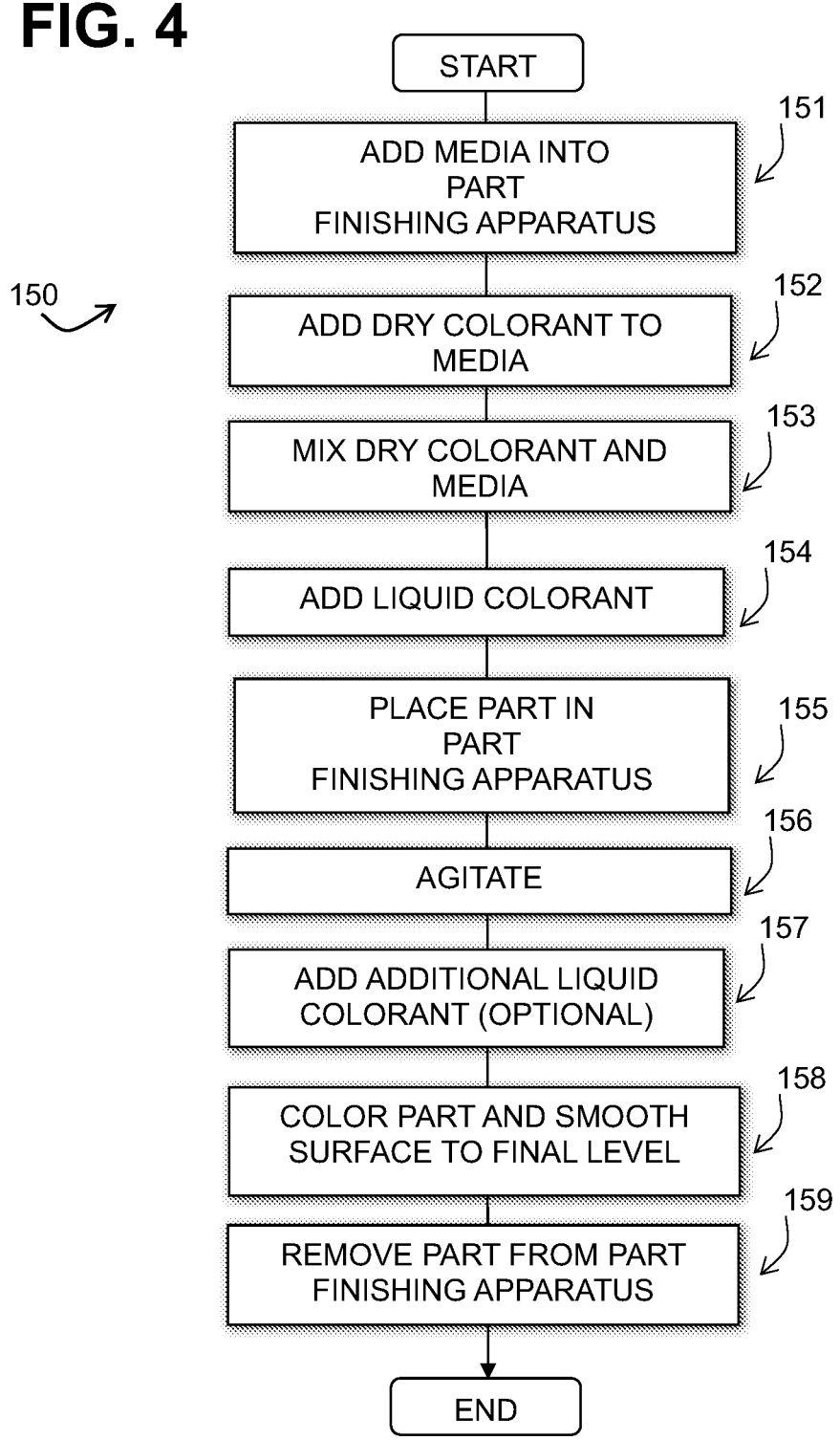
FIG. 4 is a flowchart showing an overall process for using the part finishing apparatus of FIGS. 1 and 2 for finishing a part.

FIG. 4 is a flowchart that shows an overall process 150 for finishing an additively manufactured part, wherein the finishing includes both smoothing and coloring the additively manufactured part. A finishing media is loaded into a part finishing apparatus (Step 151). The part finishing apparatus may be similar to the one depicted in FIGS. 1 and 2. The media is comprised of small, solid particles that abrade the surface of the part. One example of a suitable finishing media is UPM1 although other suitable finishing media may be used. Optionally, in this embodiment, a dry (starter) colorant is added to the media (Step 152). In one embodiment, the dry (starter) colorant is a dry powder acid dye (or ink). In one embodiment, 40 grams of the dry (starter) colorant is added to the media. The part finishing apparatus is operated to mix the media and starter colorant (Step 153). Next, a liquid colorant is added to the media (Step 154). In this embodiment, the liquid colorant is composed of:

5% 40% enamel oil-based or water-based paint,
25%-75% glycol ether,
1%-20% a resin, and
1%-20% acid dye.

More specifically, in one embodiment 40 grams of liquid colorant is added. In one embodiment, the liquid colorant is comprised of:

125 grams paint (26% by weight),
267 grams butyl carbitol (glycol ether) (56% by weight),
50 grams Rondo (resin) (10% by weight), and
40 grams black acid dye (8©% by weight).

Next, the additively manufactured part(s) are added to the media in the part finishing apparatus (Step 155). The part finishing apparatus is operated to agitate the media to smooth and color the part (Step 156). Optionally, additional colorant may be added to the media during the finishing process (Step 157). Additional colorant may be added one or more times. The part is smoothed and colored to a desired final level (Step 158). After the part is smoothed and colored to a desired final level, the part is removed from the part finishing apparatus (Step 159).

Various different colorants may be used in the part finishing apparatus 100. The colorants may be acid based or non-acid based. One type of colorant that may be used is an azo acid dye. Other colorants include RIT dyes, paints, inks, India ink, carbon-based inks, pigments, and stains. The colorant used in the part finishing apparatus may be various different colors, including red, black, gray, blue, yellow, green, orange, etc. The color of the colorant chosen for use in the part finishing apparatus takes into account the color of the part before it is placed in the part finishing apparatus (i.e., the color of the material from which the part is printed). As stated above, the colorant may be a composition comprised of a paint, a glycol ether, a resin, and an acid dye. The paint may be an enamel oil-based paint, such as Rustoleum® black semi-gloss enamel paint. Alternatively, another type of paint may be used, such as a water-based paint, a non-enamel paint, or flat black paint. The resin may be a Bondi) resin, or another type such as a polyester finishing resin or an epoxy resin. The acid dye may be a black Jacquardai acid dye, or alternatively, a black Indian ink, a RIT powder or liquid dye, or a black tattoo ink.

The part finishing apparatus can be used for coloring and smoothing metal parts made by additive manufacturing. With metal parts, the surface of the part may be passivated before application of the colorant. With metal parts, an acid may be applied before or after adding the colorant to remove any oxide layers on the metal part to help apply the colorant to the part.

In one example, during the period when the part was both being colored and smoothed, the part is maintained at a temperature of approximately 60-70 degrees C. Alternative temperature ranges both higher and lower may be used, including ambient room temperatures.

In one example, other chemicals, detergents or solutions may be added to the coloring and smoothing process, including oxalic acid, D-limonene, and Dipentene.

Operation of the Part Finishing Apparatus

Figure 5:
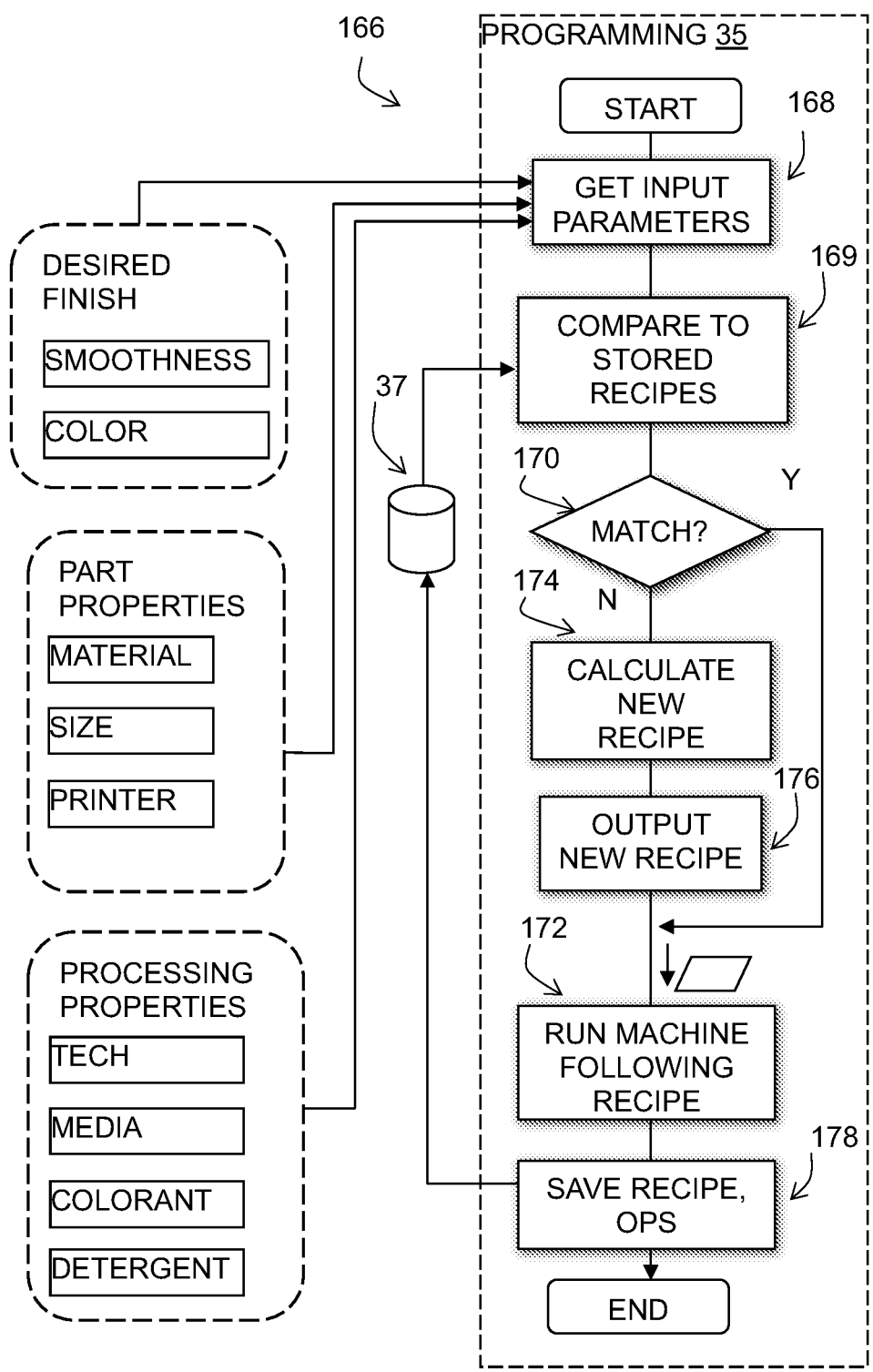
FIG. 5 is a flowchart showing a process for using the part finishing apparatus of FIGS. 1 and 2 for finishing a part.

FIG. 5 shows steps performed in a process of operation 166 of the embodiment of the part finishing apparatus in FIGS. 1 and 2. In this process, an operator uses the control panel 10 (in FIG. 2) to input parameters for finishing the part (Step 168). The programming software 35 running on the onboard computer 29 may cause the computer 29 to provide prompts via the user interface on the control panel 10 for inputting parameters. These parameters may include properties about the part being finished. These properties may include the desired finish properties of the part. These may include the desired smoothness of the finished part and the desired color of the finished part. The programming software 35 also causes the computer 29 to obtain input about other properties of the part, such as the material of which the part is composed, the size of the part, the geometry of the part, the model of printer that produced the part, as well as other information about the part. This information may be obtained from the operator via the user interface on the control panel 10. Alternatively, this information may be obtained from other sources, such as from sensors associated with the part finishing apparatus 100 that can determine these properties about the part. Such sensors may include cameras that provide imagery to image recognition programming. Alternatively, these properties may be obtained from a data transmission from the printer machine that manufactured the part. In another alternative, these properties may be obtained from labeling or a spec sheet associated with the additively manufactured part. The programming software 35 also causes the computer 29 to obtain input about the part finishing apparatus properties. These part finishing apparatus properties include the technology being used by the part finishing apparatus 100, the type of media 44 being used by the apparatus 100, the colorant being used, the detergent and/or lubricant being used, as well as other properties. The information about the part finishing apparatus properties may be obtained from the operator. Alternatively, the information about the part finishing apparatus properties may be obtained by sensors associated with the part finishing apparatus. Some of these properties may be pre-stored. For example, properties about the processing may be saved by the programming from prior operations and do not have to be reentered as long as the same technology, media, colorant and detergent are being used in the apparatus.

After the programming software 35 causes the computer 29 to obtain the parameters, the programming software 35 causes the computer 39 to compare the properties to known recipes in the recipe database 37 (Step 169). The known recipes provide operating parameters or formulae for operation of the part finishing apparatus 100 to obtain the desired finish properties for additively manufactured parts having various known manufactured properties using the known processing properties.

If the computer 29 finds a match in the recipe database for obtaining the desired finish of the part with the given part and processing properties, the programming software 35 causes the computer 29 to operate the apparatus 100 to finish the part according to the matching recipe (Steps 170 and 172). In one embodiment, the programming software 35 does not require the computer 29 to find a recipe that is an exact match for the part, finish and processing properties. Each known recipe may have a tolerance associated with one or more of the properties. Alternatively, the programming software 35 may cause the computer 29 to allow the operator to specify a tolerance level for finding a matching recipe. The operator may specify this tolerance level before or after entering the parameters for the properties.

If the computer 29 does not find a match, the programming software 35 causes the computer 29 to calculate a new recipe (Steps 170 and 174). The programming software 35 causes the computer 29 to calculate the new recipe based on information contained in known recipes, as well as other information about the part and the processing. The new calculated recipe is output and then used to operate the apparatus to provide the desired finish (Steps 176 and 172).

The recipe that was determined by the computer 29 for obtaining the desired finish properties of the additively manufactured part includes information about how long and at what agitation level to operate the part finishing apparatus without colorant, when to add the colorant and how long to operate the part finishing apparatus and at what agitation level after colorant is added in order to obtain the desired finish. The recipe may also include information about how much colorant to add, whether to add all the colorant all at once or to add colorant in portions, and if so, the size and timing of the portions. The recipe may also include information about temperature, humidity, and so on.

In addition to using the recipe for operating the part finishing machine to finish an additively manufactured part to desired finish properties for smoothness and color, the programming software 35 causes the computer 29 to save information about the selected recipe in the recipe database 37 (Step 178). If the recipe used is a new recipe calculated by the programming in Step 174, the new recipe is added to the recipe database so that the information in it can be used in the future for finishing a similar part to the same desired finish properties. If the recipe used was an existing recipe already in the recipe database 37, information that the recipe was used is stored to assist when evaluating quality, reliability, trends, history, and so on.

ALTERNATIVE EMBODIMENTS

Figure 6:
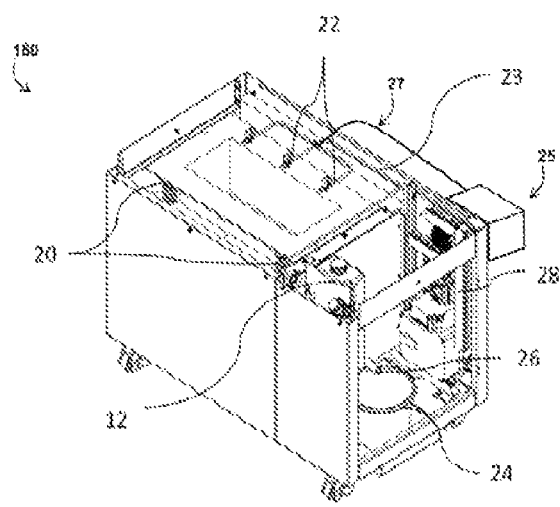
FIG. 6 is a top perspective view of an alternative embodiment of a part finishing apparatus in accordance with another embodiment of the invention.

FIG. 6 shows an alternative embodiment 180 of the part finishing apparatus. The embodiment in FIG. 6 is similar to the embodiment shown in FIG. 2 with the exception that the colorant supply line 27 connects to the spray nozzles 22. In this embodiment, the colorant is dispensed through the same nozzles 22 as the media 44. The embodiment of FIG. 6 operates similarly to the embodiment of FIGS. 1 and 2.

Figure 7:
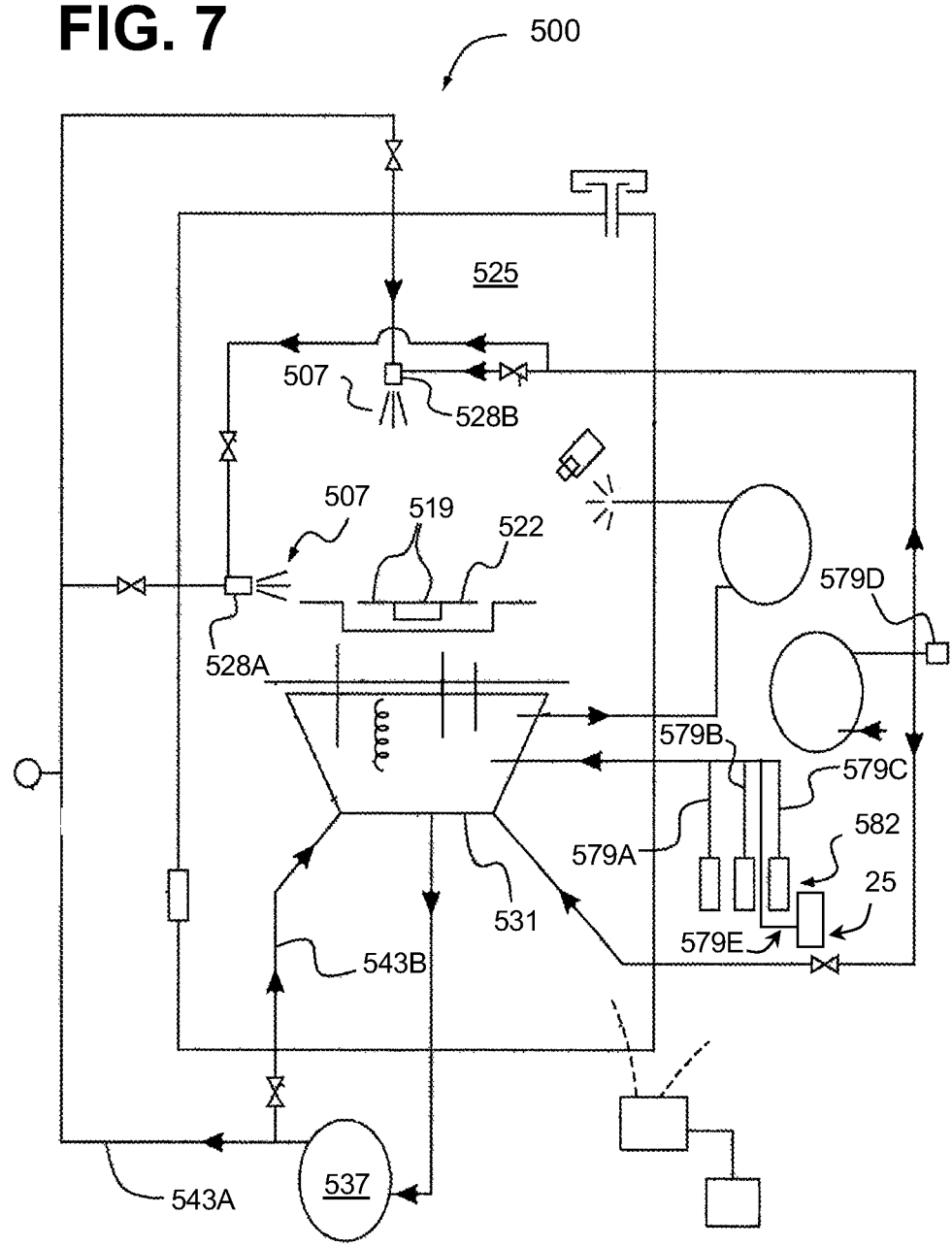
FIG. 7 is a diagram showing another alternative embodiment of the part finishing apparatus.

FIG. 7 shows another alternative embodiment of a surface finishing apparatus 500. The embodiment 500 in FIG. 7 smooths and colors additively manufactured parts. Compared to the embodiment in FIGS. 1 and 2, the embodiment in FIG. 7 uses a different technology for smoothing an additively manufactured part. As an example, the surface finishing apparatus 500 in FIG. 7 may use Thermal Atomized Fusillade ("TAF") technology for smoothing the surface of parts made by an additive manufacturing process. The surface finishing apparatus 500 is similar to the surface finishing apparatus disclosed in US Patent Application Publication US20190176403, filed Dec. 4, 2018, except as disclosed herein. The surface finishing apparatus 500 may be similar to a DECI DUO machine, manufactured by Post-Process Technologies, Inc. of Buffalo, N.Y.

In FIG. 7, the part finishing apparatus 500 uses a suspended solid media fluid ("SSM fluid") 507 to remove unwanted support material from an additive-manufactured part (the "AM-Part") 519, while also smoothing the surface finish of the build material of the AM-Part. SSM fluid 507 is a liquid media having small solid particles suspended in and/or carried by the liquid media. The particles may be selected and included to facilitate abrasion to remove support material and/or smoothing AM-Part surfaces. The AM-Part 519 is placed on a platform, such as a turntable 522, in a spraying chamber 525 of the apparatus 500. An SSM fluid 507 for smoothing of the AM-Part 19 is sprayed through nozzles 528 situated above and to the side of the AM-Part 519. The SSM fluid 507 may be supplied from a tank 531 situated below the turntable 522. A media pump 537 draws the SSM fluid 507 from the tank 531 through fluid conduits 543A, such as pipes, tubes, and/or hoses, to the nozzles 528, which, together with forced air, cause the SSM fluid 507 to spray out of the nozzles 528 at the AM-Part 519. The SSM fluid 507 then collects back into the tank 531 and the SSM fluid 507 may be recycled, i.e., drawn from the tank 531, pumped to the nozzles 528, and again sprayed at the AM-Parts 519.

In this embodiment, colorant is added using a dosing mechanism 582. The dosing mechanism 582 connects to the tank 531. The part finishing apparatus 500 includes tank ports 579 for feeding in each of water via port 579A, support material solvent via port 579B, anti-foaming agent via port 579C and colorant from a colorant supply tank 25 via a port 579E. The part finishing apparatus 500 also may include a port 579D for feeding in compressed air, which may be used to operate the nozzles 528 and/or to help keep solid media particles suspended in the SSM fluid 507 in the tank 531. The dosing mechanism 582 automatically dispenses these fluids into the tank 531. Operation of the embodiment of the part finishing apparatus 500 in FIG. 7 may be similar to the operation described in connection with FIGS. 4 and 5.

Figure 8:
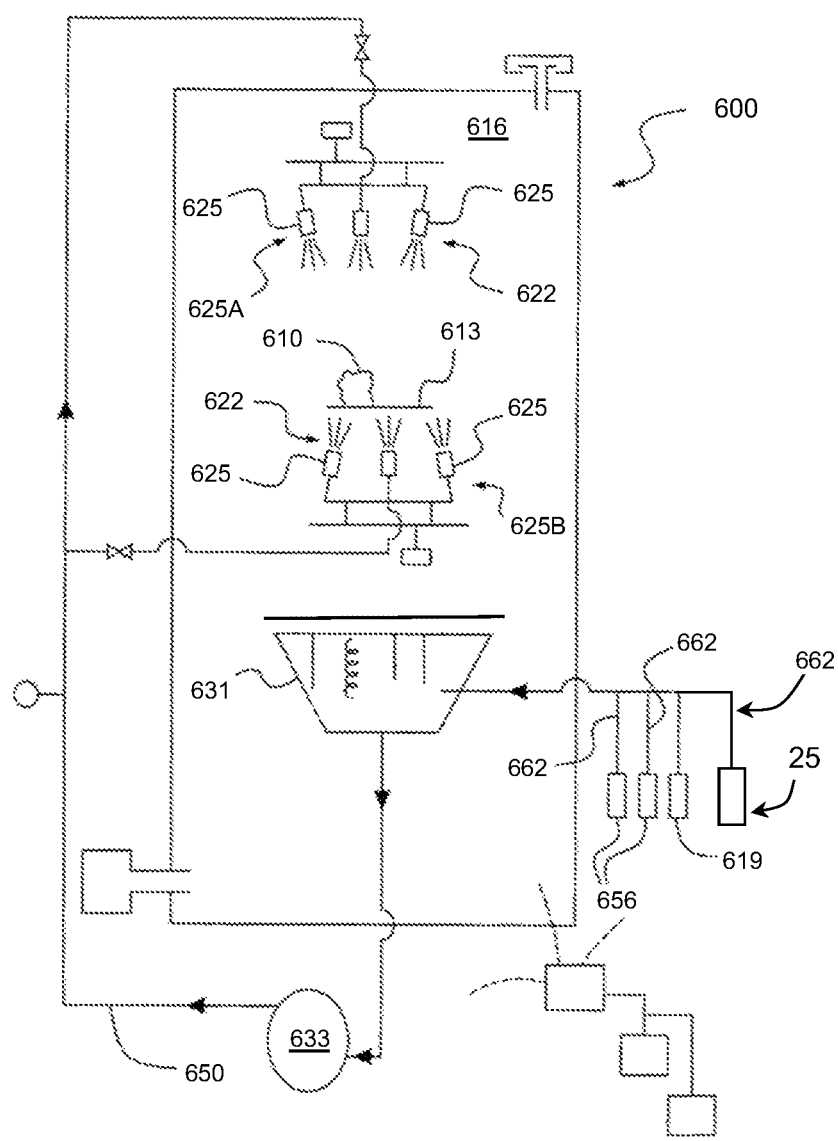
FIG. 8 is a diagram showing still another alternative embodiment of the part finishing apparatus.

FIG. 8 shows another alternative embodiment of a part finishing apparatus 600. The embodiment 600 in FIG. 8 smooths and colors additively manufactured parts. Compared to the embodiment in FIGS. 1 and 2 or FIG. 7, the embodiment 600 in FIG. 8 uses a different technology for smoothing the additively manufactured part. As an example, the surface finishing apparatus 600 in FIG. 8 may use Volumetric Velocity Dispersion ("VVD") technology for smoothing the surface of parts made by an additive manufacturing process. The part finishing apparatus 600 is similar to the part finishing apparatus disclosed in US Patent Application Publication US20190202126, filed Dec. 26, 2018, except as disclosed herein. The part finishing apparatus 600 may be similar to a BASE and DECI machines, manufactured by PostProcess Technologies, Inc. of Buffalo, N.Y.

In FIG. 8, one or more additively manufactured parts 610 are placed on a platform or tray 613 in a chamber 616. A fluid 622 for dissolving and/or eroding the support material and surface finishing is sprayed at the part 610 through nozzles 625 situated underneath and above the part 610. The fluid 622 is supplied from a tank 631, open at its upper side. The tank 631 is situated below the nozzles 625. A pump 633 draws the fluid 622 from the tank 631 through a series of pipes 650 connected to the nozzles 625, which causes the fluid 622 to spray at the part 610. The fluid 622 collects back into the tank 631 where the fluid 622 is recycled back through the apparatus 600 in a closed-loop system.

The tank 631 may be filled automatically with the fluid 622 based on parameters set by the operator or as may be pre-stored in connection with a given operating recipe that the operator has the option to select. To this end, the part finishing apparatus 600 may include devices for supplying each of water, support material solvent (also referred to as detergent), colorant, and anti-foaming agent supplies. Water may be supplied from a facility's water supply 619 or from a reservoir or other storage tank. Solvent and anti-foaming agent may be supplied each from their own reservoir or storage tank, such as a bucket 656 connected to the apparatus by a hose 662 or other conduit. Colorant is supplied from a colorant supply tank 25. The hose 662 for each of the solvent, anti-foaming agent and colorant may be connected to a mechanism, such as a water-powered pump, for automatically dispensing such fluids into the tank 631. Operation of the embodiment of the part finishing apparatus 600 in FIG. 8 may be similar to the operation described in connection with FIGS. 4 and 5.

Figure 9:
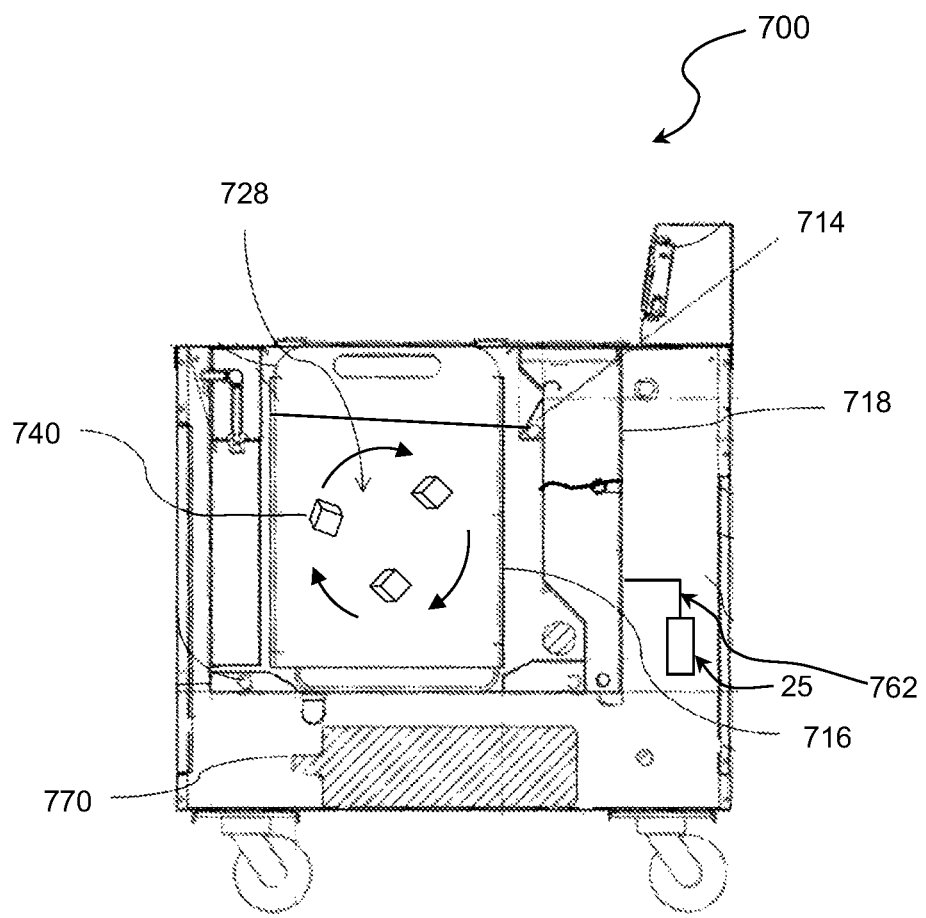
FIG. 9 is a cross sectional view of yet another alternative embodiment of the part finishing apparatus.

FIG. 9 shows another alternative embodiment of a surface finishing apparatus 700. The embodiment 700 in FIG. 9 smooths and colors additively manufactured parts. Compared to the embodiments in FIGS. 1 and 2, 7, or 8, the embodiment in FIG. 9 uses another different technology for smoothing additively manufactured parts. As an example, the surface finishing apparatus 700 in FIG. 9 may use Submersed Vortex Cavitation ("SVC") technology for smoothing the surface of parts made by an additive manufacturing process. The surface finishing apparatus 700 is similar to the surface finishing apparatus disclosed in US Patent Application Publication US20170348910, Jun. 1, 2017, except as disclosed herein. The surface finishing apparatus 700 may be similar to a DEMI or CENTI surface finishing apparatus, manufactured by PostProcess Technologies, Inc. of Buffalo, N.Y.

Referring to FIG. 9, a cross-sectional side view shows various components of the part finishing apparatus 700. Parts 740 are placed into the part finishing apparatus 700 through a lid (not shown) whereupon the parts 740 enter an output tank 716. The output tank 716 is filled with a liquid mass 728, which flows circularly from an input tank 718 in response to activation of a pump (not shown), which causes the liquid mass 728 to flow under pressure from a tank manifold 714. An ultrasonic generator 770 is shown below output tank 716.

In the embodiment in FIG. 9, the liquid mass 728, which may be a detergent, is pumped through the pump from a lower area of input tank 718 through multiple manifolds 714 into the output tank 716, generating a hydraulic pressure and rotational flow within the output tank 716. A colorant is supplied from a colorant supply tank 25. A supply line 762 connects the colorant supply tank 25 to the input tank 718 for automatically dispensing the colorant into the input tank 718 so that colorant can be added to the liquid mass 728.

The flow of liquid mass 728, passing through the set of tank manifolds 714, is generally rotational such that the liquid mass 728 forms a vortex and that the parts 740 do not generally reach the surface of the liquid mass 728. The position of the manifolds 714 and the direction of the flow of the liquid mass 728 generated from the manifolds 714 creates a vortex that suspends the parts between a surface of the liquid mass 728 and a bottom and sides of the output tank 716. Operation of the embodiment of the part finishing apparatus 700 in FIG. 9 to smooth and color a part may be similar to the operation described in connection with FIGS. 4 and 5.

In another alternative embodiment, the media used for smoothing an additively manufactured part may itself include a colorant that is released as the additively manufactured part is smoothed by the media. In the embodiment, the desired final color may be obtained by adding a liquid during the smoothing process to dilute the colorant being absorbed by the additively manufactured part.

Additional Alternative Embodiments

In one alternative mode of operation, the operator does not know beforehand what colorant to use to obtain a desired color. In this mode of operation, the operator queries the programming on the part finishing apparatus to advise what colorant to use. After being advised what colorant to use, the operator fills the colorant supply tank 25 with the appropriate colorant.

Figure 10:
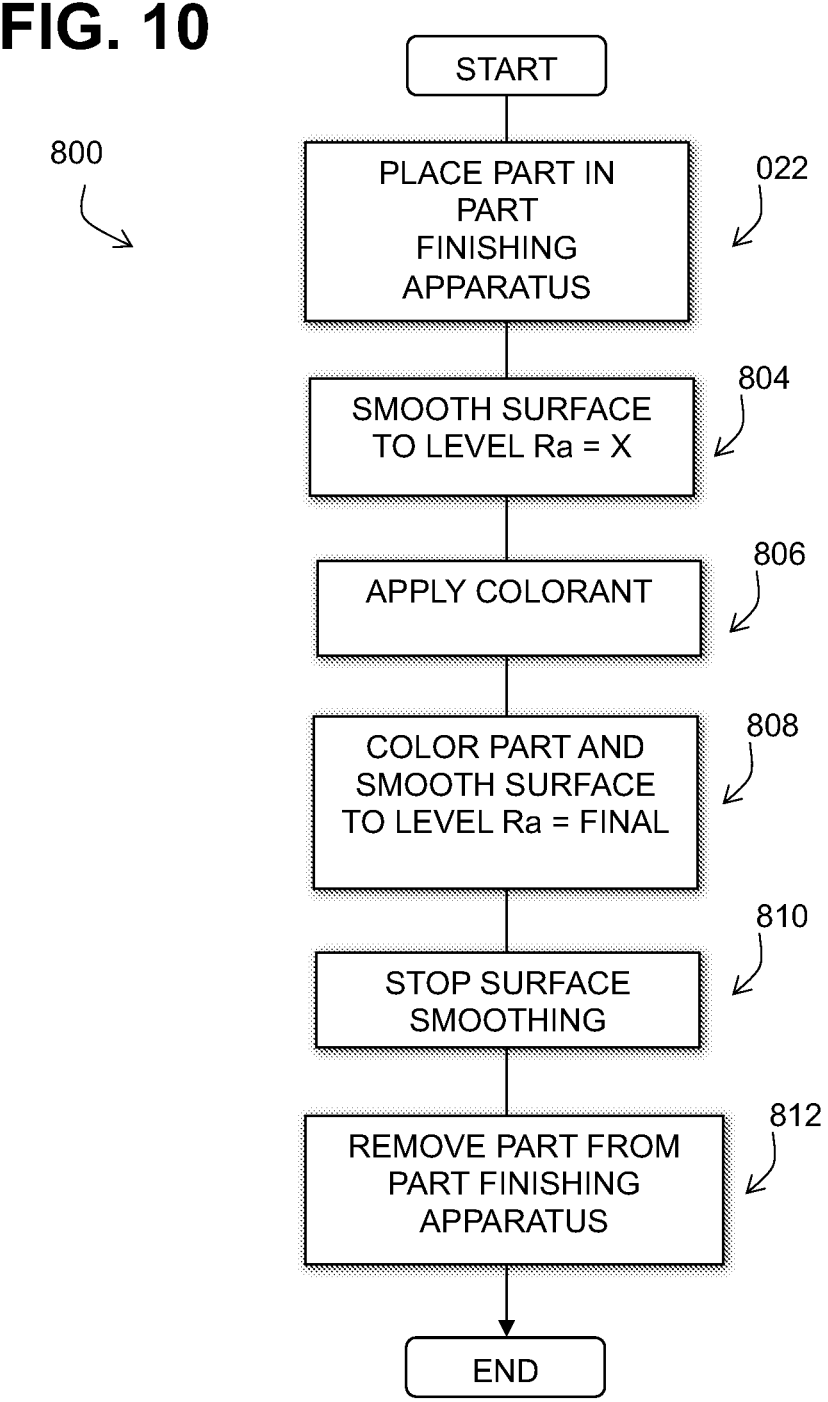
FIG. 10 is a flowchart showing an alternative embodiment of a process for finishing a part.

FIG. 10 shows the steps in an alternative embodiment of a process 800 using the part finishing apparatus 100 to surface finish an additively manufactured part. The unfinished additively manufactured part is placed in the part finishing apparatus (Step 802). In this alternative embodiment, the part finishing apparatus is operated to smooth the surface of the part to an intermediate level of smoothness, Ra=X, without a colorant (Step 804). Then, colorant is added to the media in the part finishing apparatus (Step 806). The part finishing apparatus 100 is operated to continue smoothing the surface of the additively manufactured part while colorant is included in the media (Step 808). When the surface of the part is a desired smoothness and the part is at a desired color, the part finishing apparatus is stopped (Step 810). The part is removed from the part finishing apparatus (Step 812).

In the embodiment of FIG. 10, to finish a part with the desired color and smoothness, the duration of the smoothing process before adding colorant is determined and the duration of the smoothing process after adding the colorant is determined. When colorant is added to the media in the finishing tank, the colorant adheres to or into the surface of part. The colorant may remain on the surface of the part or may be absorbed into the surface of the part. However, the smoothing process removes material from the part. Therefore, in this embodiment of operation, adding colorant in an initial stage of smoothing may be unnecessary because the colorant would adhere to material that will be removed during the smoothing process. In this embodiment, colorant is added to the surface smoothing process at a stage at which the final surface of the part can be exposed to colorant.

In the embodiment of FIG. 10, D\determining the duration of the smoothing process before and after adding colorant also takes into account various properties. One such property is the desired final color. For example, in order to obtain a desired color or color saturation, the part may require being exposed to the colorant for a specified period of time.

In this embodiment, the duration of the smoothing process before and after adding colorant also takes into account what agitation level is needed to obtain a desired smoothness of the finished part given the amount of time the part needs to be exposed to colorant. As an example, the apparatus may be operated at a higher agitation level before the colorant is added. Operating the apparatus at a higher agitation level removes unwanted material faster. However, if the part requires being exposed to colorant for a specified period of time, the agitation level of the part may be reduced to match the time needed for coloring so that the part is smoothed to the desired level of smoothness at the same time that the part is also colored to the desired final color. The duration of the second period (i.e., the time during which the part is smoothed and colored) is determined so that the time to obtain the desired smoothness coincides with the time to obtain the desired color, given that the part will be smoothed and colored simultaneously. The duration of the first period (i.e., the time during which the part is smoothed without colorant) is determined to smooth the part to an intermediate level of smoothness so that further smoothing with the colorant present obtains both the desired smoothness and the desired color at the same time.

In the alternative described in FIG. 10, the part finishing apparatus may include one or more part sensors that can detect properties of the part when it is in the finishing tank. The sensor operates to sense the smoothness of the part as the part finishing apparatus is being operated to smooth the surface of the part. The part sensor may include a camera that obtains imagery of the part as the surface of the part is being smoothed or as unwanted support material is being removed. The output of the camera is provided to image recognition software that analyzes the imagery of the part to determine the smoothness of the surface of the part. Instead of a camera, other types of sensors may be used, such as an ultrasonic sensor or lidar. When the surface of the part is determined to be a first specified smoothness, Ra=X, colorant is applied to the part by adding colorant to the finishing tank via the colorant nozzles. The finishing process is continued as the part is smoothed and colored until the desired finish properties are obtained.

In the embodiment described in FIG. 10, instead of having sensors associated with the finishing tank to determine the smoothness of the part as it is being finished, the part may be visually inspected by an operator to determine if a desired intermediate level of smoothness has been obtained. In this alternative, the finishing process may be temporarily stopped, the part removed from the finishing tank and visually inspected. A determination may then be made to add colorant and continue the smoothing process or to continue the smoothing process without adding the colorant until a desired intermediate level of smoothness is obtained.

Figure 11:
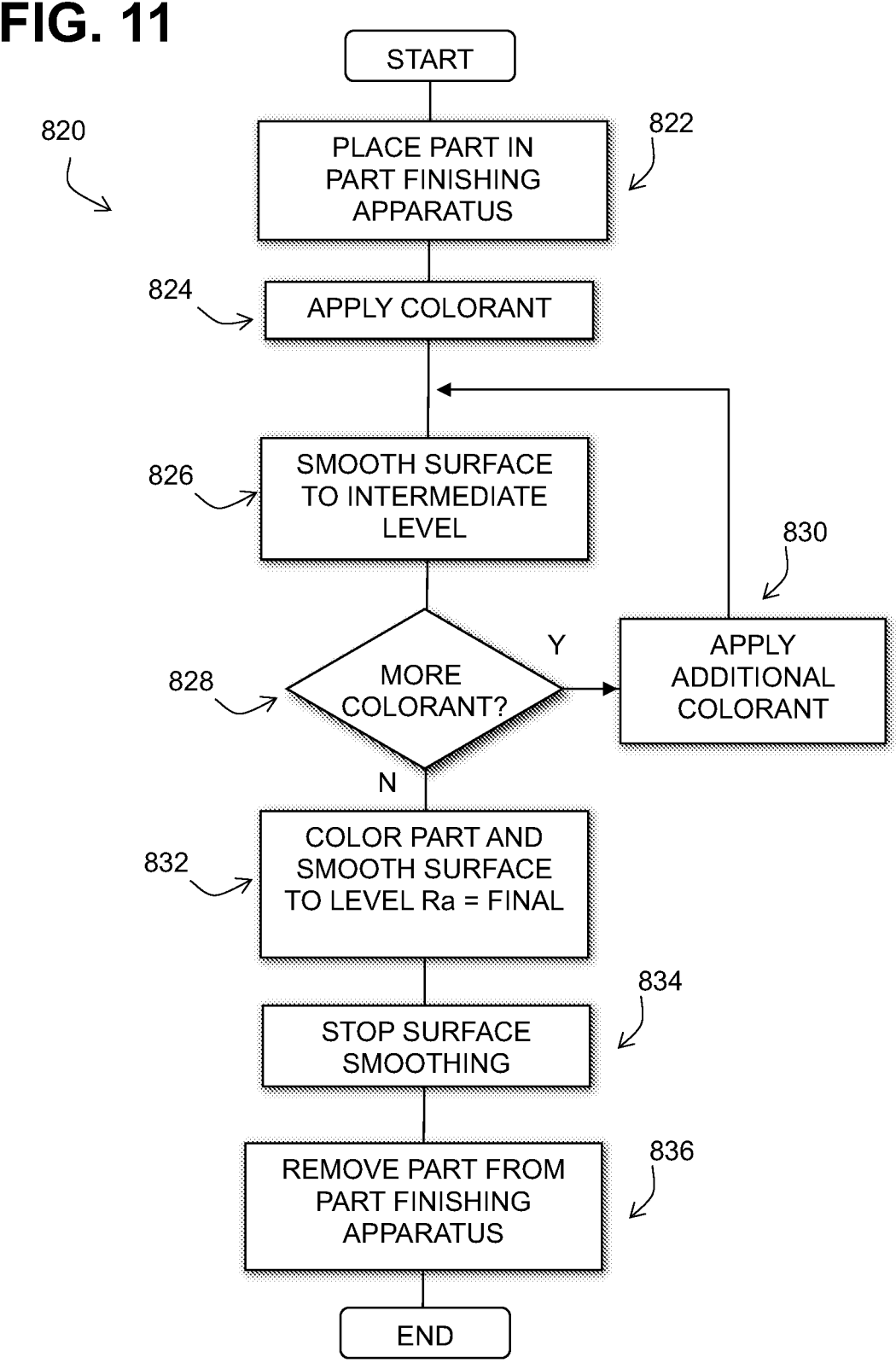
FIG. 11 is a flowchart showing another alternative embodiment of a process for finishing a part.

FIG. 11 shows still another alternative embodiment of a process 820 for surface finishing an additively manufactured part. The process 820 in FIG. 11 is similar to the process depicted in FIG. 4. The process shown in FIG. 11 differs from the process shown in FIG. 4 in that the process shown in FIG. 11 optionally adds additional colorant. In the process 820 in FIG. 11, the unfinished additively manufactured part is placed in a part finishing apparatus (Step 822). If the part finishing apparatus is similar to the apparatus depicted in FIGS. 1 and 2, media has already been added to the part finishing apparatus. Colorant is added to the media in the part finishing apparatus (Step 824), or alternatively, the colorant may be added before the unfinished additively manufactured part is placed in a part finishing apparatus. The part finishing apparatus is operated to smooth and color the surface of the additively manufactured part (Step 826). At an intermediate stage, a determination is made whether to add additional colorant (Step 828). The determination may be made by an operator who visually examines the part. Alternatively, this determination may be made by a programmed computer associated with the part finishing apparatus that receives input from sensors that detect properties of the part being finished and colored. According to another alternative, the determination may be made automatically following a recipe being used to finish and color the part. If the determination is made to add additional colorant, additional colorant is added (Steps 828 and 830). The process then loops back to the step of smoothing the part (Step 826). The part is then smoothed to another intermediate stage at which point a determination is made again whether to add additional colorant (Step 828). Additional colorant may be added multiple times. When a determination is made not to add additional colorant, the part is smoothed to a final level of smoothness (Steps 828 and 832). The smoothing process is stopped (Step 834) and the part is removed from the finishing apparatus (Step 836).

Figure 12:
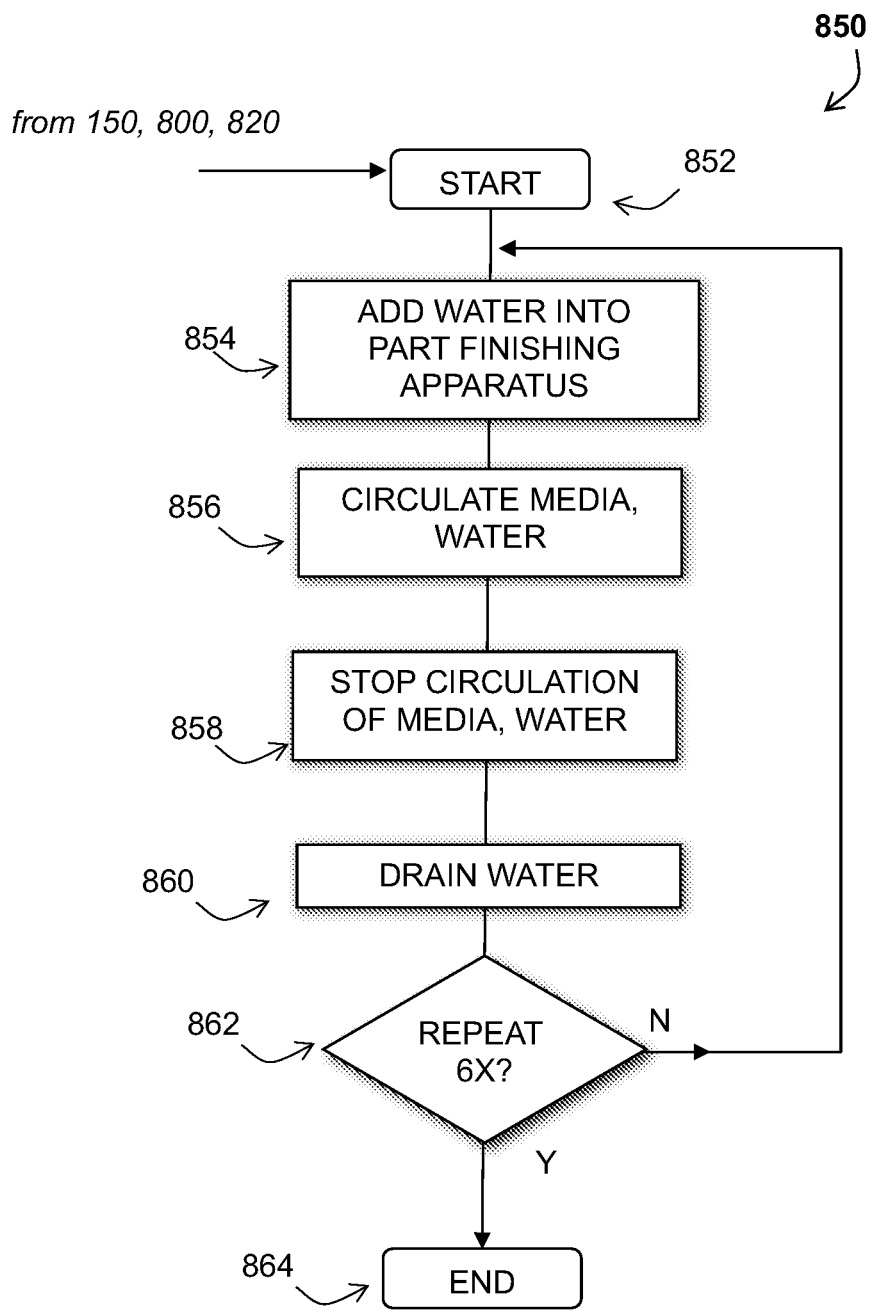
FIG. 12 is a flowchart showing a process for cleaning a part finishing apparatus after using part finishing apparatus to finish a part.

FIG. 12 shows a process 850 for cleaning a part finishing apparatus like the one shown in FIGS. 1 and 2 after using the part finishing apparatus for smoothing and coloring a part. For example, the process 850 in FIG. 12 can be used after using the process 150 shown in FIG. 4, the process 800 shown in FIG. 10, or the process 820 shown in FIG. 11. The process 850 can also be used to clean the media used in the part finishing apparatus. The process 850 in FIG. 12, starts after the smoothed and colored part has been removed from the part finishing apparatus (Step 852). In this process 850, the media still remains in the part finishing apparatus. Next, water is added to the part finishing apparatus (Step 854). In one embodiment, approximately two gallons of water are added to the part finishing apparatus. Alternatively, other amounts of water or other suitable fluid may be used. Next, the part finishing apparatus is operated, i.e., the media is caused to flow cyclically in the finishing tank of the part finishing apparatus (Step 856). In one embodiment, the media is caused to flow in the part finishing apparatus for approximately 5 minutes. Alternatively, the media may be caused to flow for other durations of time. Then, the part finishing apparatus is operated to stop the media from flowing in the finishing tank of the part finishing apparatus (Step 858). Next, the water is drained from the finishing tank of the part finishing apparatus (Step 860). The steps of adding water (Step 854), causing the media to flow (Step 856), stopping the media flow (Step 858), and draining the water (Step 860) are repeated 5 to 6 times (Step 862). After the steps of adding water, causing the media to flow, stopping the media flow, and draining the water (Step 848) are repeated 5 to 6 times, the process is deemed complete (Step 864). The part finishing apparatus is ready to be used again to smooth and color more parts.

Having provided details of the invention, the following statements may be viewed as summarizing some of the aspects of the invention described above.

Statement 1 ("S1"). A method of surface finishing a part produced by an additive manufacturing process, the method comprising:
smoothing a surface of the part; and coloring the part while smoothing the surface of the part.

Statement 2 ("S1"). The method of S1 further comprising, prior to coloring the part while continuing to smooth the surface of the part, smoothing the surface of the part for a first duration without coloring the part.

Statement 3 ("S3"). The method of S2 wherein a colorant is added after the first duration.

Statement 4 ("S4"). The method of S2 or S3 wherein a rate of smoothing during the first duration is different from a rate of smoothing while coloring the part.

Statement 5 ("S5"). The method of any prior Statement wherein the step of coloring further comprises adding a colorant.

Statement 6 ("S6"). The method of any prior Statement wherein the colorant comprises:
5©%-40% by weight enamel oil-based or water-based paint,
25%-75% by weight glycol ether,
1%-20% by weight a resin, and
1V-20% by weight a dye or ink.

Statement 7 ("S7"). The method of any of Statements S1 through S5 wherein the colorant comprises:
26% by weight paint,
56% by weight butyl carbitol,
10% by weight Bondo resin, and
8% by weight black acid dye.

Statement 8 ("S8"). The method of any prior Statement wherein a desired smoothness and a desired color occur approximately simultaneously.

Statement 9 ("S9"). The method of any prior Statement wherein the step of smoothing further comprises abrading the part in media of solid particles.

Statement 10 ("S10"). The method of any prior Statement wherein the step of smoothing further comprises spraying the part with a flow of liquid entrained with solid particles from nozzles located above the part.

Statement 11 ("S11"). The method of any prior Statement wherein the step of smoothing further comprises spraying the part with a liquid flow from nozzles located above and below the part.

Statement 12 ("S12"). The method of any prior Statement wherein the step of smoothing further comprises abrading the part in a liquid vortex.

Statement 13 ("S13"). The method of any prior Statement further comprising selecting a recipe for finishing the part to a desired smoothness and color.

Statement 14 ("S14"). The method of any prior Statement, wherein the part is a metal part, and wherein the method further comprises removing an oxide layer of the metal part before coloring the part.

Statement 15 ("S15"). The method of Statement 14, wherein the oxide layer of the metal part is removed by applying an acid.

Statement 16 ("S16"). The method of any prior Statement further comprising adding additional colorant while coloring the part.

Statement 17 ("S17"). An apparatus for finishing a part produced by an additive manufacturing process, the apparatus comprising:
a tank into which the part can be smoothed to a desired smoothness by abrasion by solid media; and
a source of colorant connected to the tank for dispensing the colorant to the solid media in the tank.

Statement 18 ("S18"). An apparatus for finishing a part produced by an additive manufacturing process, the apparatus comprising:
a chamber in which the part can be smoothed to a desired smoothness by a spray of a liquid entrained with solid particles from nozzles located above the part; and
a source of colorant connected to the chamber for dispensing the colorant to the part in the chamber.

Statement 19 ("S19"). An apparatus for finishing a part produced by an additive manufacturing process, the apparatus comprising:
a chamber in which the part can be smoothed to a desired smoothness by a spray of a liquid from nozzles located above and below the part; and
a source of colorant connected to the chamber for dispensing the colorant to the part in the chamber.

Statement 20 ("S20"). An apparatus for finishing a part produced by an additive manufacturing process, the apparatus comprising:
a tank into which the part can be smoothed to a desired smoothness by abrading the part in a liquid vortex; and
a source of colorant connected to the tank for dispensing the colorant to the liquid vortex in the tank.

Statement 21 ("S21"). A method of cleaning a part finishing apparatus used for finishing a part made by an additive manufacturing process after the part finishing apparatus has been used to color the part made by the additive manufacturing process while also smoothing the part made by the additive manufacturing process, the method comprising:
after removing the part made by the additive manufacturing process after the part made by the additive manufacturing process has been smoothed and colored, adding a washing fluid to a media in which the part made by the additive manufacturing process had been smoothed and colored by a colorant that had been added to the media;
operating the part finishing apparatus to cause the media to flow in the part finishing apparatus for a duration;
draining the washing fluid from the part finishing apparatus; and
repeating the steps of adding the washing fluid, operating the part finishing apparatus to cause the media to flow in the part finishing apparatus for a duration, and draining the washing fluid,
whereby the part finishing apparatus is cleaned.

Statement 22 ("22"). A composition for a colorant for a finishing process that smooths a surface of an additively manufactured part while coloring the additively manufactured part, the composition comprising:
5%-40% by weight enamel oil-based or water-based paint,
25%-75% by weight glycol ether,
1%-20% by weight a resin, and
1-20% by weight a dye or ink.

Statement 23 ("S23"). The composition of Statement 22 further comprising:
26% by weight paint,
56% by weight butyl carbitol,
10% by weight Hondo resin, and
8% by weight black acid dye.

Statement 24 ("S24"). The composition of Statement 22 wherein the enamel, oil-based or water-based paint comprises at least one of: a Rustoleum® black semi-gloss enamel paint, a non-enamel paint, and a flat black paint.

Statement 25 ("S25"). The composition of Statement 22 wherein the resin comprises at least one of: a Bondo resin, a polyester finishing resin, and an epoxy resin.

Statement 26 ("S26"). The composition of Statement 22 wherein the dye comprises at least one of: a black Jacquardai acid dye, a black Indian ink, a RIT powder, a liquid dye, and a black tattoo ink.

Although the disclosure has been described with reference to certain preferred embodiments, it will be appreciated by those skilled in the art that modifications and variations may be made without departing from the spirit and scope of the disclosure. It should be understood that applicant does not intend to be limited to the particular details described above and illustrated in the accompanying drawings.

We claim:

1. A method of surface finishing a part produced by an additive manufacturing process, the method comprising:
    smoothing a surface of the part; and
    coloring the part while smoothing the surface of the part, wherein the step of coloring further comprises adding a colorant, wherein the colorant comprises:
        5%-40% by weight enamel oil-based or water-based paint,
        25%-75% by weight glycol ether,
        1%-20% by weight a resin, and
        1%-20% by weight a dye or ink.

2. The method of claim 1 further comprising, prior to coloring the part while continuing to smooth the surface of the part, smoothing the surface of the part for a first duration without coloring the part.

3. The method of claim 2 wherein a colorant is added after the first duration.

4. The method of claim 2 wherein a rate of smoothing during the first duration is different from a rate of smoothing while coloring the part.

5. The method of claim 1 wherein a desired smoothness and a desired color occur approximately simultaneously.

6. The method of claim 1 wherein the step of smoothing further comprises spraying the part with a flow of liquid entrained with solid particles from nozzles located above the part.

7. The method of claim 1 wherein the step of smoothing further comprises spraying the part with a liquid flow from nozzles located above and below the part.

8. The method of claim 1 wherein the step of smoothing further comprises abrading the part in a liquid vortex.

9. The method of claim 1 further comprising selecting a recipe for finishing the part to a desired smoothness and color.

10. The method of claim 1, wherein the part is a metal part, and wherein the method further comprises removing an oxide layer of the metal part before coloring the part.

11. The method of claim 10, wherein the oxide layer of the metal part is removed by applying an acid.

12. The method of claim 1 further comprising adding additional colorant while coloring the part.

13. A method of surface finishing a part produced by an additive manufacturing process, the method comprising:
    smoothing a surface of the part; and
    coloring the part while smoothing the surface of the part, wherein the step of coloring further comprises adding a colorant, wherein the colorant comprises:
        26% by weight paint,
        56% by weight glycol ether,
        10% by weight resin, and
        8% by weight black acid dye.

* * * * *